(12) United States Patent
Sanhaji

(10) Patent No.: US 6,170,541 B1
(45) Date of Patent: Jan. 9, 2001

(54) LEAK DETECTION DYE INTRODUCTION SYSTEM AND METHOD

(75) Inventor: Rahhali Sanhaji, Florence (IT)

(73) Assignee: Bright Solutions, Inc., Troy, MI (US)

( * ) Notice: Under 35 U.S.C. 154(b), the term of this patent shall be extended for 0 days.

(21) Appl. No.: 09/183,144

(22) Filed: Oct. 30, 1998

(51) Int. Cl.7 ........................................ B65B 1/04
(52) U.S. Cl. ................. 141/98; 141/67; 141/38; 62/77; 62/292
(58) Field of Search .................... 141/18, 38, 65, 141/66, 67, 98, 383; 62/177, 292

(56) References Cited

U.S. PATENT DOCUMENTS

| | | |
|---|---|---|
| 2,096,099 | 10/1937 | Gaugler . |
| 3,785,164 | 1/1974 | Wrenn . |
| 3,937,029 * | 2/1976 | Grahl et al. ............................ 62/77 |
| 4,612,798 | 9/1986 | Roberts . |
| 4,693,118 | 9/1987 | Roberts . |
| 4,938,063 | 7/1990 | Leighley . |
| 5,070,917 * | 12/1991 | Ferris et al. ........................... 141/38 |
| 5,149,453 | 9/1992 | Parekh . |
| 5,167,140 | 12/1992 | Cooper et al. . |
| 5,272,882 | 12/1993 | Degier et al. . |
| 5,357,782 | 10/1994 | Henry . |
| 5,673,722 * | 10/1997 | Brass ....................................... 62/77 |
| 5,826,636 | 10/1998 | Trigiani . |
| 5,967,204 * | 10/1999 | Ferris et al. .......................... 141/67 |

OTHER PUBLICATIONS

Davis, "Pinpointing Vehicle Leaks Faster with Ultraviolet Light", The American Society for Nondestructive Testing, Inc., Nov. 1989, vol. 47, No. 11, pp. 1248–1250.

Davis, "Pinpointing HFC–134a leaks is easy if you use the proper equipment", Air Conditioning Heating & Refrigeration News, Dec. 7, 1992, pp. 36–41.

* cited by examiner

Primary Examiner—Steven O. Douglas
Assistant Examiner—Khoa Huynh
(74) Attorney, Agent, or Firm—Fish & Richardson PC

(57) ABSTRACT

A leak detection dye introduction system for introducing a leak detection dye composition into a climate control system includes an adaptor having an outlet and an inlet connected by a flow path to the outlet, and a valve assembly located between the inlet and the outlet. The outlet is connectable to a transfer unit having an actuating valve and the inlet is connectable to a housing.

20 Claims, 2 Drawing Sheets

LEAK DETECTION DYE INTRODUCTION SYSTEM AND METHOD

BACKGROUND OF THE INVENTION

The invention relates to a method of introducing a leak detection dye composition into a climate control system, and a system for introducing the dye composition into the system.

Leak detection methods have been developed to analyze fluid systems, such as climate control systems, i.e., heating, cooling, ventilating, and air conditioning systems, for leaks using dyes. Some methods employ emissive substances, such as, for example, fluorescent or phosphorescent dyes that are added to the refrigerants and/or lubricants of a climate control system. Suitable leak detection dyes include a naphthalimide dye, a perylene dye, a thioxanthane dye, a coumarin dye, or a fluorescein dye, and derivatives thereof.

Leaks can be detected by observing light emission from the dye at leak sites resulting from excitation of the dye with a light source having particular illumination characteristics (e.g., at wavelengths suitable to excite the dye and cause light emission from the dye). In general, the dyes emit brightly when excited by light in the 190 to 700 nanometer wavelength range.

SUMMARY OF THE INVENTION

In general, the invention features a leak detection dye introduction system for introducing a leak detection dye composition into a climate control system. The leak detection dye introduction system can include a housing loaded with a leak detection dye composition and an adaptor for introducing the leak detection dye composition into a transfer unit which is used to introduce the dye into the climate control system.

In one aspect, the invention features a method of introducing a leak detection dye composition into a climate control system. The method includes connecting a transfer unit to an outlet of a housing, opening the valve assembly; transferring the leak detection dye composition into the transfer unit, removing the transfer from the outlet, connecting the transfer unit to a climate control system, and introducing the leak detection dye composition from the transfer unit into the climate control system. The outlet includes a valve assembly and the housing includes a leak detection dye composition.

In other embodiments, the transferring step can include transporting the leak detection dye composition under a pressure differential from the housing into the transport unit. In yet another embodiment, the method can include the step of charging the climate control system with a refrigerant through the transfer unit.

The transfer unit can be under reduced pressure prior to being connected to the outlet. The transfer unit can be a low-side service hose. The transfer unit can include an actuating valve. Additionally, the transfer unit can be a component of a refrigerant charging unit, e.g., a refrigerant recovery and recycling system. The leak detection dye composition can have a volume of less than 0.5 ounces. The climate control system can be an air conditioning system.

In another aspect, the invention features a method of introducing a leak detection dye composition into a climate control system. The method includes loading a leak detection dye composition from a housing into a reduced pressure transfer unit, and charging a climate control system with a refrigerant through the reduced pressure transfer unit to transport the leak detection dye composition into the climate control system.

In another aspect, the invention features a leak detection dye introduction system including an adaptor having an outlet connectable to a transfer unit having an actuating valve, an inlet connected by a flow path to the outlet, the inlet being connectable to a housing containing a leak detection dye, and a valve assembly located between the inlet and the outlet the valve assembly being opened and closed by the activating valve of the transfer unit.

In other embodiments, the inlet can be threaded. Additionally, the actuating valve of the transfer unit can include a stem that actuates the valve assembly.

Typically, the housing can have a volume of less than about 1 ounce, preferably less than about 0.75 ounces, and more preferably less than about 0.5 ounces. For example, the housing volume can be between 1.0 and 0.25 ounces. In general, less than 1 ounce of leak detection dye composition is loaded into the housing. Preferably, the volume of leak detection dye composition introduced into the systems is less than about 0.75 ounces, and more preferably less than about 0.5 ounces. For example, the leak detection dye composition can have a volume between about 0.50 and 0.10 ounces (e.g., about 0.25 ounces).

The leak detection dye composition includes a leak detection dye. Examples of a dye include a naphthalimide dye, a perylene dye, a coumarin dye, a thioxanthane dye, a fluorescein dye, or a derivative thereof, or other dye compatible with climate control systems. The dye composition exhibits fluid flow. Preferably, the dye composition can be a liquid.

The leak detection dye composition can also include a refrigerant or a lubricant. The refrigerant can include chlorofluorocarbons, hydrochlorofluorocarbons, hydrofluorocarbons, carbon dioxide, ammonia, halogenated or ether derivatives of methane or ethane, or halogenated ether or cyclic derivatives of propane, butane, pentane, or other hydrocarbons. Examples of a refrigerant include 1,1,1,2-tetrafluoroethane (R-134a, Allied Signal, Morristown, N.J.) and dichlorodifluoromethane (R-12, DuPont, Wilmington, Del.). The lubricant can include polyalkylene glycols, polyolesters, mineral oils, polyvinyl ethers, alkylbenzenes, or other synthetic lubricating materials. Additionally, the leak detection dye composition can include other additives used in climate control systems.

The climate control system can be a mobile, stationary, window air conditioning system such as an automotive, portable, residential, or commercial air conditioning system, or any other hermetic system that employs a refrigerant and lubricant.

The method of introducing a leak detection dye into a climate control system can reduce spillage of dye during injection, since the dye is transferred into the transfer unit from the housing in a sealed system. Also, by using a reduced pressure transfer unit, the risk of spilling dye is reduced. Accordingly, the introduction of dye can be cleaner. The leak detection introduction system can be used to deliver more consistent amounts of a leak detection dye into a climate control system. The leak detection dye introduction system is compact, making it easy to handle and use. The leak detection delivery system can be more efficient at delivering a fixed amount of dye composition to the system.

For example, the leak detection injection system can be used in conjunction with standard refrigerant charging units, such as refrigerant recovery and recycling systems. Thus, the leak detection dye introduction system can minimize servicing time and effort. The small volume of the leak detection dye composition used in the leak detection dye system can reduce the amount of extraneous materials (e.g., dye, extra lubricant, and extra refrigerant) introduced into a climate control system.

Additional features and advantages of the invention will become apparent from the detailed description of the preferred embodiments of the invention.

DESCRIPTION OF THE PREFERRED EMBODIMENTS

In general, the invention features a leak detection dye introduction system for introducing a leak detection dye composition into a climate control system. The leak detection dye introduction system includes a housing and an adaptor having a valve assembly. The adaptor is connectable to a transfer unit, such as a portion of a refrigerant charging unit.

Figure 1:
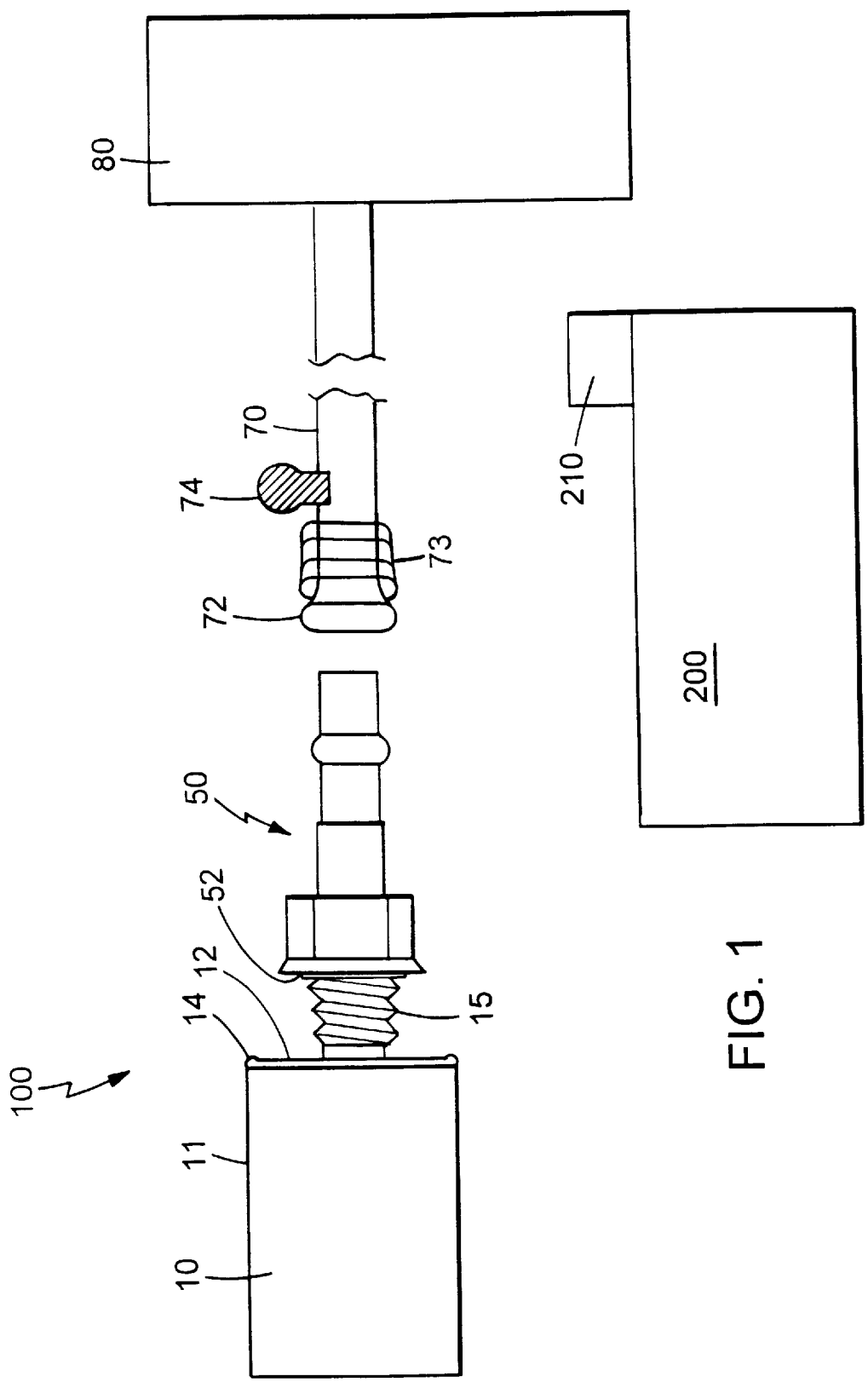
FIG. 1 is a schematic view of a leak detection dye injection system.

Referring to FIG. 1, leak detection dye injection system 100 includes housing 10, e.g., a bottle, and dye injector 50. Housing 10 is loaded with a leak detection dye composition (not shown). Housing 10 includes outlet port 15, e.g., a threaded outlet port. Dye injector 50 is used to transfer a leak detection dye composition into climate control system 200. For example, dye injector 50 can be attached to the low pressure side of servicing system 80. In this configuration, leak detection composition can be introduced into the servicing system 80, which in turn, can be introduced into low-side service port 210 of climate control system 200. Servicing system 80 can include a refrigerant charging unit such as a refrigerant recovery and recycling system.

Figure 2:
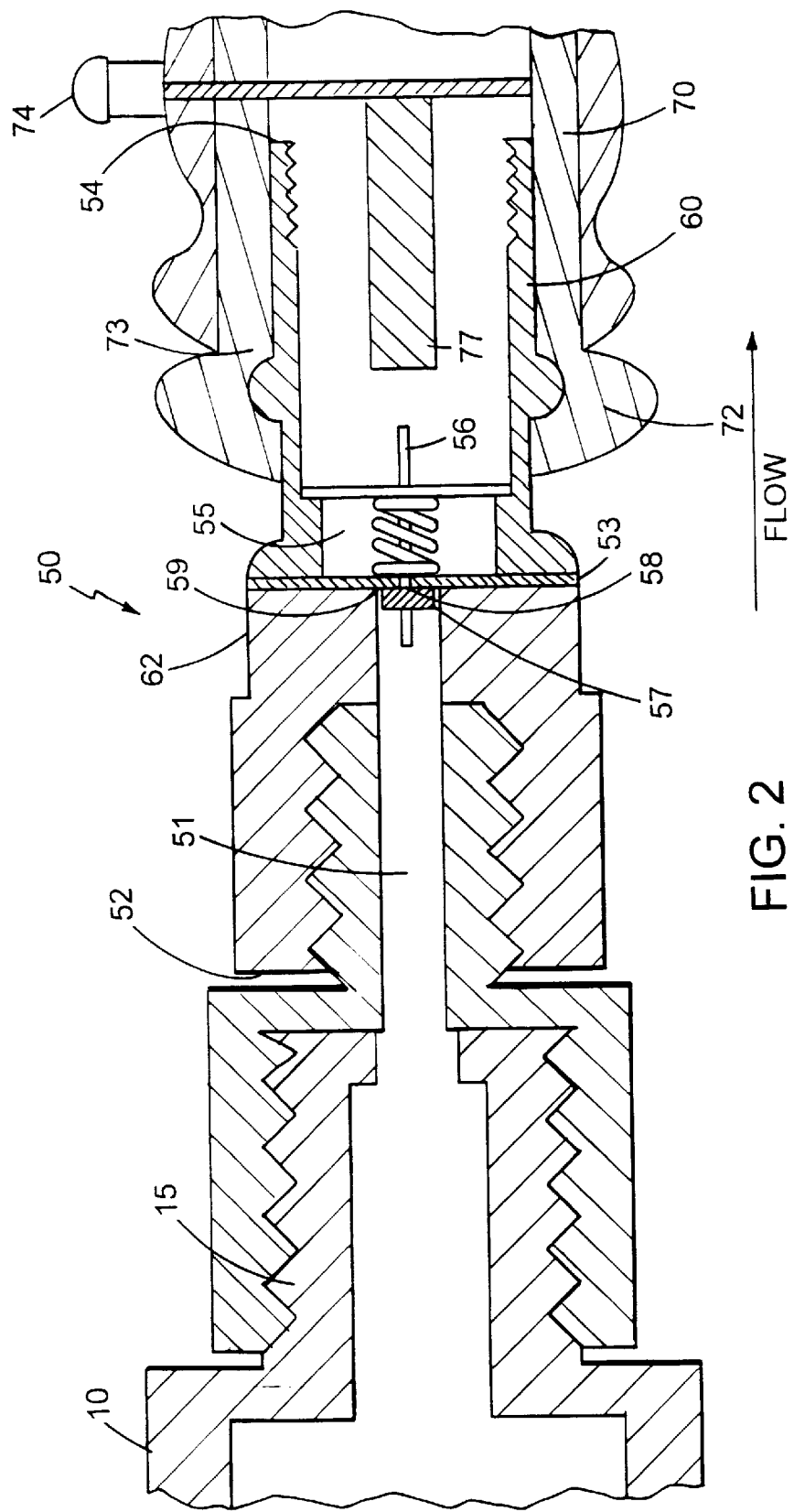
FIG. 2 is a cross-sectional view of a leak detection dye injection system.

Referring to FIG. 2, dye injector 50 includes adaptor 62 and transfer unit 70. Adaptor 62 includes first inlet end 52 and second outlet end 54 having outer surface 60. A flow path 51 provides fluid communication between inlet 52 and outlet 54. Flow path 51 is also equipped with valve assembly 55, e.g., a check valve or a Schrader-type valve, located between inlet 52 and outlet 54. Typically, valve assembly 55 includes pin 56 attached to valve plate 57, and tension spring 58 which pulls valve plate 57 towards edge 53 of flow path 51, creating fluid seal 59. Transfer unit 70 includes transfer port 72 equipped with coupler 73, such as a service coupler for R-134a refrigerant systems, and actuating valve 74. Alternatively, outlet 54 of adaptor 62 can be equipped with an actuating valve. Suitable couplers and actuating valves can be obtained from Robinair, located in Montpelier, Ohio.

Adaptor 62 can be used to introduce a leak detection dye composition into a climate control unit. For example, once inlet 52 of adaptor 62 is attached to outlet port 15 of housing 10, (valve assembly 55 inhibits the flow of leak detection dye composition through fluid path 51 to outlet 54 of adaptor 62), outer surface 60 of outlet 54 is inserted into transfer port 72 and secured via coupler 73. Opening actuating valve 74 has two functions. First, opening actuating valve 74 allows fluid communication between outlet 54 and transfer unit 70. Second, turning actuating valve 74 causes plunger 77 of actuating valve 74 to depress pin 56 of regulating valve 55, opening valve plate 57. Once transfer unit 70 is in fluid communication with adaptor 62 and housing 10, the leak detection dye composition can be introduced into transfer unit 70 by tipping canister 10, adaptor 62, and transfer unit 70 upside down such that gravity forces the leak detection dye composition to flow into transfer unit 70. Alternatively, if transfer unit 70 is under reduced pressure relative to adaptor 62 and housing 10, leak detection dye composition can be moved by a pressure differential from housing 10 through adaptor 62 and into transfer unit 70 when actuating valve 74 is opened.

Once loaded with leak detection dye composition, actuating valve 74 can be closed, thereby inhibiting the flow of leak detection dye out of transfer unit 70. Transfer unit 70 can be removed from adaptor 62 via coupler 73 and leak detection dye composition can be introduced into a climate control system by attaching transfer port 72 to the low pressure side of a climate control system.

In general, the housing can have a total volume less than about 1 ounce. For example, the housing can have a volume of 0.75 to 0.50 ounces. Suitable material for housings, valve assemblies, actuating valves, and couplers include stainless steel, aluminum, or plastics. Suitable housings (e.g., 0.25 ounce bottles) can be obtained from Kaufman Container Co., Cleveland, Ohio, or Quality Container Co., Ypsilanti, Mich. Suitable material for transfer units include, but are not limited to, stainless steel, copper, rubber, or plastics. Examples of actuating valves include quick connect valves such as Servicing Couplers for R-134a, part number 18190A from Robinair, located in Montpelier, Ohio, Service Coupling Assemblies RC01C-002 or RC01C-003 from Aeroquip, New Haven, N.J., or Quick Coupler QCH14 or QCL4 from CPS Products, Hialeh, Fla. Examples of valve assemblies include Schrader valves available from Wright Tools, Troy, Mich. (part 40536), or Granger, Troy, Mich. (part 3GD03).

The leak detection dye composition can include a liquid dye. The liquid dye can include a visible or a fluorescent dye. Suitable dye compositions include, for example, STAY BRITE BSL 712, STAY BRITE BSL 713, STAY BRITE BSL 714, (Bright Solutions, Troy, Mich.), DAY GLOW TRY-33 (Day Glow Color Corp., Cleveland, Ohio), R-12 Dye (part 16252, SPX Corporation, Robinair, Montpelier, Ohio) or R-134a Dye (part 16253, SPX Corporation, Robinair, Montpelier, Ohio) or other dyes.

Typically, a leak detection dye injection system is used with a refrigerant recovery and recycle system. Examples of refrigerant recovery and recycle systems include, but are not limited to, ENVIRO CHARGE, Model 12134B, manufactured by Robinair located in Montpelier, Ohio, and ECOLIMA recovery, recycle and recharger machine, model numbers ECK 34C and ECK 12C, manufactured by ECOTECHNICS located in Sesto Fiorentino, Firenze, Italy.

The injection system is used in conjunction with a refrigerant charging unit. A refrigerant charging unit can include devices used to service a climate control system, such as a refrigerant recovery and recycle system. The purpose of a refrigerant recovery and recycle system is to recover refrigerant from a mobile or stationary climate control system, such as an automobile air conditioning system without venting it into the atmosphere. The recovery and recycle system uses a vacuum pump, a recovery canister, and a transfer unit, such as a hose, equipped with a coupling valve (e.g., a quick coupler connector) and an actuating valve, to remove refrigerant gas from the low pressure servicing port of the climate control system. Once removed, the refrigerant is stored in the recovery canister located in the refrigerant recovery and recycle system. At this point, the transfer unit can be isolated from the recovery canister and removed from the low pressure servicing port of the climate control system by closing the actuating valve and detaching the transfer unit by the coupling valve. Once isolated and removed, the transfer unit remains under reduced pressure.

With the transfer unit under reduced pressure, a leak detection dye composition can be introduced into the climate control system by utilizing the pressure differential between the outside and the inside of the transfer unit. Briefly, an inlet port of the adaptor is connected to a housing containing a leak detection dye composition. Then, the coupling valve of the transfer unit is connected to an outlet port of the adaptor. In this configuration, the valve assembly located in the adaptor restricts the leak detection dye composition flow between the adaptor and the transfer unit. The actuating valve, opens the transfer unit and the valve assembly allowing fluid communication between the housing, the adaptor, and the transfer unit. When the valve assembly in the adaptor is opened, the leak detection dye composition is removed from the housing and introduced into the transfer unit.

In general, the leak detection dye composition can be loaded into the transfer unit by means of a pressure differential between the housing, the adaptor, and the transfer unit. For example, the transfer unit has a reduced internal pressure relative to the adaptor and the housing. The transfer unit has sufficient length and inner diameter to accept a loading volume of the leak detection dye composition. Typically, the loading volume contains less than about 0.50 ounces of leak detection dye composition, more preferably about 0.25 ounces of leak detection dye composition.

Once loaded with the leak detection dye composition, the actuating valve is closed and the transfer unit is disconnected from the adaptor. The transfer unit is then reattached to the low pressure service port of the climate control system. The actuating valve is opened and leak detection dye composition is introduced into the climate control system as a charge of refrigerant is sent from the recovery and recycling system through the transfer unit into the climate control system.

Alternatively, the leak detection dye injection system can be used independent of a refrigerant recovery and recycling system. For example, a transfer unit can include a coupling valve and an actuating valve located at opposite ends of the transfer unit. The transfer unit can be connected to a vacuum pump and the pressure within the transfer unit can be reduced. Once under reduced pressure, the transfer unit can be isolated and disconnected from the vacuum pump. The leak detection dye composition can be introduced into the transfer unit by connecting the activating valve to an adaptor. After loading the transfer unit with a leak detection dye composition, the transfer unit is removed from the adaptor. The leak detection dye composition can be introduced into the climate control system by connecting one coupling valve to the reduced pressure service port of a climate control system and connecting the coupling valve to a refrigerant recharge canister, typically, under positive pressure. The two actuating valves of the transfer unit can be opened and the leak detection dye composition can be introduced into the climate control system as additional refrigerant flows out of the recharge canister through the transfer hose and into the climate control system. Suitable recharge canisters are available from Granger, Troy, Mich. (part 3GD22), or Wright Tool, Troy, Mich. (part 17571).

After loading the leak detection dye composition into a climate control system, the system is operated to circulate the leak detection dye composition. The circulating refrigerant disperses the leak detection dye throughout the system.

Typically, the dye content of the system can be below about 0.1 percent. After the dye has been allowed to circulate within the system, system components, joints, or attachments can be examined with a light source having a light emission wavelength from 190 nanometers to 700 nanometers. The presence of a leak can be determined by the presence of a colored visual indication, such as fluorescence or other light emission, that can be detected after excitation with the light from the light source. Alternatively, if the leak detection composition includes a visible leak detection dye, i.e., visible to the unaided eye, the presence of a leak can be determined by visual inspection of the climate control system.

Other embodiments are within the claims.

What is claimed is:

1. A method of introducing a leak detection dye composition into a climate control system, comprising:

connecting a transfer unit to an outlet of a housing, wherein the transfer unit is a component of a servicing system, the outlet includes a valve assembly and the housing includes a leak detection dye composition;

opening the valve assembly;

transferring the leak detection dye composition into the transfer unit, the transferring including transporting the leak detection dye composition under a pressure differential from the housing into the transfer unit;

removing the transfer unit from the outlet;

connecting the transfer unit to the climate control system; and introducing the leak detection dye composition from the transfer unit into the climate control system.

2. The method of claim 1, wherein the transfer unit is under reduced pressure prior to being connected to the outlet.

3. The method of claim 1, wherein the transfer unit is a low-side service hose.

4. The method of claim 1, wherein the transfer unit is a component of a refrigerant charging unit.

5. The method of claim 4, wherein the refrigerant charging unit is a refrigerant recovery and recycling system.

6. The method of claim 1, wherein leak detection dye composition has a volume of less than 0.5 ounces.

7. The method of claim 1, further comprising charging the climate control system with a refrigerant through the transfer unit.

8. The method of claim 1, wherein the transfer unit includes an actuating valve.

9. The method of claim 8, wherein the actuating valve includes a stem that actuates the valve assembly.

10. The method of claim 1, wherein the climate control system is an air conditioning system.

11. The method of claim 1, wherein the leak detection dye composition includes a liquid dye.

12. A method of introducing a leak detection dye composition into a climate control system, comprising:

loading a leak detection dye composition from a housing into a reduced pressure transfer unit, the transfer unit being a component of a servicing system; and charging a climate control system with a refrigerant through the reduced pressure transfer unit to transport the leak detection dye composition into the climate control system.

13. The method of claim 12, wherein the leak detection dye composition has a volume of less than about 0.5 ounces.

14. The method of claim 12, wherein the climate control system is an air conditioning system.

15. The method of claim 12, wherein the reduced pressure transfer unit is a low-side service hose.

16. The method of claim 12, wherein the reduced pressure transfer unit is a part of a refrigerant charging unit.

17. The method of claim 16, wherein the refrigerant charging unit is a refrigerant recovery and recycling system.

18. The method of claim 12, wherein the transfer unit includes an actuating valve.

19. The method of claim 18, wherein the actuating valve includes a stem that actuates the valve assembly.

20. The method of claim 12, wherein the leak detection dye composition includes a liquid dye.

* * * * *